(12) United States Patent
Andersson et al.

(10) Patent No.: US 6,470,177 B1
(45) Date of Patent: Oct. 22, 2002

(54) ADAPTIVE SECTORIZATION

(75) Inventors: Sören Andersson, Sollentuna (SE); Henrik Dam, Fredriksberg (DK); Magnus Berg, Stockholm (SE); Marc Frerich, Oelde (DE); Felix Ahrens, Reinheim (DE); Rainer Bormann, Velbert (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/549,557

(22) Filed: Apr. 14, 2000

(30) Foreign Application Priority Data

Apr. 15, 1999 (SE) .............................................. 9901360

(51) Int. Cl.[7] .............................................. H04B 1/02
(52) U.S. Cl. ........................... 455/91; 455/561; 455/91; 375/219
(58) Field of Search .............................. 455/73, 78, 83, 455/91, 95, 101, 103, 132, 133, 560, 88, 403, 561, 566; 375/219, 295, 316, 220

(56) References Cited

U.S. PATENT DOCUMENTS

| 4,128,740 A | 12/1978 | Graziano |
| 5,805,575 A | 9/1998 | Kamin, Jr. |
| 5,838,670 A | 11/1998 | Billström |
| 5,920,813 A | * 7/1999 | Evans et al. ................. 342/359 |
| 6,167,286 A | * 12/2000 | Ward et al. .................. 455/132 |
| 6,314,305 B1 | * 11/2001 | Solondz et al. ............. 342/373 |

FOREIGN PATENT DOCUMENTS

| EP | 0364190 A2 | 4/1990 |
| EP | 0604403 A1 | 6/1994 |
| EP | 0725498 A1 | 8/1996 |
| WO | 98/08321 | 2/1998 |

* cited by examiner

Primary Examiner—William Trost
Assistant Examiner—Congvan Tran
(74) Attorney, Agent, or Firm—Burns, Doane, Swecker & Mathis, L.L.P.

(57) ABSTRACT

The present invention relates generally to the problems associated with sectorization of cells in cellular communications systems, and more particularly to interference between sectors. The invention provides the possibility of flexibly distributing hardware between sectors in a cell by allowing one transmitter to be shared by all the sectors. Since a beacon signal must be transmitted to each sector in a cell, it can be combined with the signal from the transmitter before being transmitted from an antenna. Thus it is necessary to only deploy one carrier for the beacon. Interference reduction in sectored sites is also improved. In addition, different antenna patterns may be combined to provide the site with all kinds of coverage patterns. Downlink diversity is furthermore attainable by having overlapping uncorrelated antenna patterns.

16 Claims, 5 Drawing Sheets

ADAPTIVE SECTORIZATION

This application claims priority under 35 U.S.C. §§119 and/or 365 to 9901360-9 filed in Sweden on Apr. 15, 1999; the entire content of which is hereby incorporated by reference.

FIELD OF THE INVENTION

The present invention relates generally to the problems associated with sectorization of cells in cellular communications systems, and more particularly to interference between cells.

RELATED ART

Cellular radio systems provide telecommunications services to mobile users. These mobile users move through the cellular system, so-called because the geographic area of the system is divided into "cells" which have base stations which are responsible for communicating with the mobile users of the system.

Each cellular system is allocated a certain bandwidth of frequencies which are available for communication with the mobile users. The available frequencies are divided between the cells so that certain frequency resources are reused by certain cells so that the distance between the reused frequencies is such that co-channel interference is maintained at tolerable levels. With smaller reuse distances a higher capacity can be provided by a cellular network. The frequency reuse distances are limited on the downlink by interference levels from the co-channel cells using the same frequencies. Typically the downlink (transmitting from a base station to a mobile station) is the limiting link. When the system is noise limited the uplink can be limiting.

In order to meet the increasing demand, numerous methods have been developed to decrease interference, thereby increasing the capacity of a cellular system. One of the most well-known solutions is to divide the covered area into sectors thereby increasing the capacity of a cellular system. In cellular systems, antennas are provided at each base station site to provide communications to the mobile systems in a given area of the system. Each base station has a plurality of sectored antennas to provide communications on a plurality of frequencies. Antennas cover an arc of e.g. 60° or 120°, depending on the number of antenna arrays employed. In the GSM and D-AMPS systems sectors of 120° are widely used, while in PDC systems sectors of 60° are typical.

A key disadvantage of the sectorized approach is that radio transceivers at each cell are dedicated to particular sectors which leads to significant levels of trunking inefficiency. In practice this means that more transceivers will be needed at each base station site than for an omni-directional cell of the same capacity. In addition, each sector of the cell is treated by the cellular system as a separate cell. This means that as mobile users of the system move from one sector to another there will be considerable interaction required to handover the call to another sector, requiring higher network overhead and reducing capacity.

Another disadvantage of the sectorization approach is that it also involves an increase in hardware complexity since the transceivers are dedicated to one sector and are then not available for other sectors. This presents a major problem with present sectorization methods and techniques in their lack of flexibility in hardware allocation. If the traffic at one specific time is high in bne sector and low in another sector then it is not possible to use the transceivers in the low traffic sector cells to increase the capacity in the high traffic cells.

A broadcast control channel, or beacon, is a fundamental element in all cellular radio systems. Each sector/cell has a single broadcast channel that is assigned to a single frequency, i.e. beacon frequency, and is transmitted from the base station. The broadcast channel is used to identify the base station to the mobile users as a primary station in the area or as an additional channel to the one currently in use for e.g. handover. It also provides synchronisation and general system information to the mobile stations in the system. Each mobile station makes measurements of the signal on some or all of the broadcast channels it can receive. Results of these measurements can be used to change base stations or sectors.

It is the broadcast channel that is used to tell the mobile station which frequency to use to contact the base station and which is used when the base station is receiving an incoming call from a mobile station. Protocols in current cellular radio systems require the broadcast channel to be transmitted continuously over the entirety of the cell. In a sectored system as widely used in e.g. WCDMA, GSM or D-AMPS the beacon frequency is also used to define sector borders. In these systems a frequency has to be allocated for this purpose in each sector. This involves repeating the control part of the beacon signal for each sector, thereby occupying n-times more frequency resources for an n-sector site as compare to an omni-direction site. Furthermore, beacon frequencies are restricted to low spectral efficiency and it is not possible to use features like power control or discontinuous transmission on beacon frequencies.

Existing systems which use narrow beams to contact mobile units must then use multiple narrow beams to cover all the sectors in a cell. Existing narrow-beam systems can produce an omni-directional broadcast channel in different ways. One solution is provided where all of its narrow beams can be transmitted simultaneously. This, however, results in phase problems, not only with the base station but also with neighbouring base stations.

Another solution is provided by using an additional omni-directional antenna. The problem with this approach is that the omni-directional antenna has a significantly lower gain than a narrow beam antenna. To cover the same range as the traffic channels the omni-directional antenna requires a higher strength power amplifier.

Another prior art method is the method of having a so-called floating transceiver in a sectored site, as disclosed in AU-9475006. The floating transceiver can be switched between the different sectors and cells covered by the site, depending on the needed traffic capacity. The floating transceiver can be allocated to different sectors/cells originating from the same base station site, instead of using only one cell identity. The technique disclosed in AU-9475006 does not solve the trunking of the beacon carriers and does not involve a number of fixed transceivers, which can not be switched between the different sectors.

Yet another method is the method of having a base station antenna arrangement with a plurality of antenna apertures, as shown in EP 0795257. There are provided a plurality of beams where the traffic and broadcast channels share the same apertures and selection means are provided that select which narrow beam on which to transmit the broadcast channel. However, the invention according to this patent still has the disadvantage that the broadcast channel will only be received by a mobile station for a proportion of the time which will lead to other problems. Another problem here is that the solution shown only receives signals from a given mobile one beam at a time, rather than from all beams in the cell. This can cause problems in e.g. random access. Furthermore, the transmission signal is amplified after combination which is not possible in certain current standards, e.g. GSM.

Another state-of-the-art technique is to use adaptive antenna arrays, as disclosed in WO 95/09490. An adaptive antenna consists of an array of spatially distributed antennas. Signals are received from mobile users by the array. These are combined to extract the individual signals from the received superposition, even if they occupy the same frequency band. It is then possible to distinguish between spatially separated users by using narrow adaptive antenna lobes. The use of these narrow adaptive antenna lobes requires that the position or, more exactly, the best spatial filters for reception and/or transmission to and from, the mobile station be known. The solution provided in this patent uses a wider antenna lobe for transmitting important information on the broadcast channel. This technique implies that the signal is transmitted in a beam in the most feasible direction to the mobile station. By this technique of using adaptive antennas the transmitted interference can be even more reduced than in the case of sectorization.

However, the crucial issue of providing a matched coverage in the cell with a broadside control signal(beacon) is not addressed in state-of-the-art adaptive antennas. Furthermore, state-of-the-art use of adaptive antennas often involve architectures of digital beamforming, involving a high degree of hardware complexity, i.e. linear amplifiers, calibration, etc., thereby leading to higher costs.

The problems to be solved can be summarised as making available deployed transceiver hardware to all sectors in a cell while, at the same time, maintaining or even improving the interference situation. Furthermore, the necessity of redundant beacon channels is a problem which is avoided.

SUMMARY OF THE INVENTION

The present invention relates generally to the problems associated with sectorization of cells in cellular communications systems, and more particularly to the problems discussed above. The means of solving these problems according to the present invention are summarised in the following.

As can be seen above, there still exists a problem with current methods of dealing with interference in cellular radio systems which employ sectorization such as e.g. GSM and D-AMPS. These systems must broadcast their beacon signal over all the sectors in a cell. Broadcasting the signal over all the sectors simultaneously results in phase problems. Use of an omni-directional antenna suffers from the problems of significantly lower gain. The method of floating transceivers does not solve the trunking problems and has greater hardware complexity.

Accordingly, it is an object of the present invention to provide a method to decrease the co-channel interference in sectorized systems while decreasing the hardware complexity.

The invention provides the possibility to flexibly distribute deployed hardware between the sectors at a given cell site. This can be advantageous when the traffic is distributed differently on different hours of the day, since all transceiver hardware has access to 360 degrees coverage. At the same time, interference reduction is improved, providing a smooth migration from omni-directional sites to sectored sites.

Redundant use of the beacon carriers is also avoided. In the normal three-sectorization you need 3 beacon carriers whereas as in adaptive sectorization according to the present invention it is only necessary to deploy one carrier for the beacon for each cell rather than for each sector.

Furthermore, it is possible to combine different antenna patterns by shaping the coverage provided to the site to any general desired coverage patterns.

Downlink diversity is also obtainable by having overlapping uncorrelated antenna patterns.

Although the invention has been summarised above, the method according to the present invention is defined according to appended claims 1. Various embodiments are further defined in dependent claims 2–17.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

Figure 1:
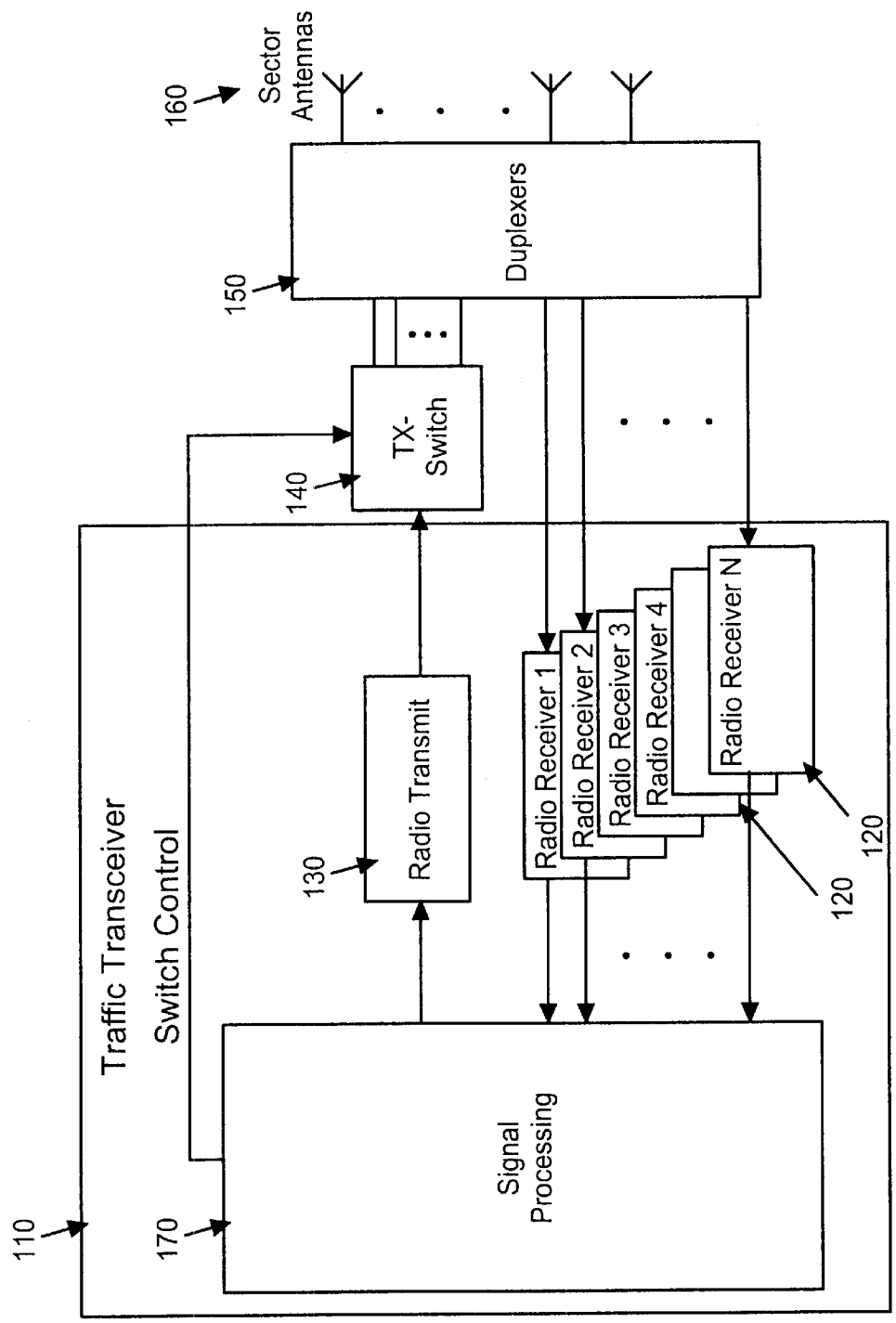
FIG. 1 is a diagram of a transceiver structure according to the present invention.

The solution to some of the problems of sectorization of present systems as discussed above are solved here by an invention which shall be referred to as adaptive sectorization. The principle of adaptive sectorization is based on a transceiver structure 110, comprising multiple receivers 120 and one transmitter 130 connected to a switch 140, as shown in FIG. 1. This transceiver structure 110, is connected through the necessary means for duplexing 150, filtering and combining to the antenna systems, comprising a set of sector antennas 160.

FIG. 1 shows a transceiver structure 110, typically located at a base station, connected to a set of sector antennas 160, thereby making it possible to cover a whole cell site. The downlink is transmitted in the sector where the mobile is located, thereby avoiding redundant beacon signals and handovers between sectors. The transmission on the downlink is determined by uplink measurement of quality and signal strength of the desired mobile, performed e.g. in a signal processing module 170. The transceiver 110 shown in FIG. 1 can be connected to many different antenna configurations.

Figure 2:
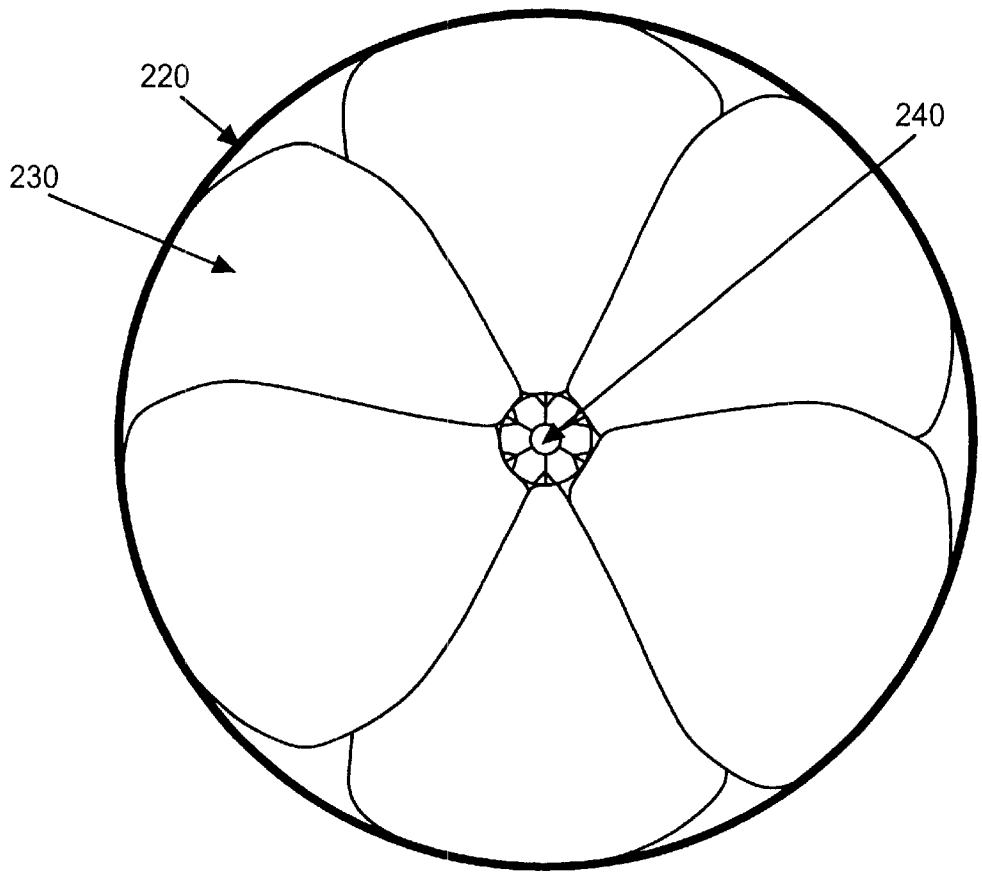
FIG. 2 is a diagram of a standard cellular coverage area.

FIG. 2 shows a possible antenna configuration 210 to which the transceiver 110 of FIG. 1 can be connected. The site is covering an omni-directional site with homogenous antenna patterns. FIG. 2 shows 6 sectors 230, although there can be more or less, can be distributed from an omni-directional site. The beacon carrier 220 is connected to an omni-directional antenna 240, providing the same coverage area as all the beams together.

Other possible antenna configurations, to which the transceiver structure 110 shown in FIG. 1 can be connected, are also possible. These may comprise various combinations of different polarisations and radiation patterns. This makes it possible to shape the effective covered cell area (which typically is not circular as shown in FIG. 2), thereby adjusting it to the local environment. Local propagation characteristics such as mountains, roads, forests etc., can be compensated for by shaping, together the right types of antennas. Individual lobes can be either decreased or increased, thereby adjusting the overall shape.

In addition, traffic distribution, e.g. cities or main roads, can also be taken into account by placing more narrow sectors in these directions, thereby reducing the interference more in these directions of high traffic. The same is the case for downtilt, where the downtilt angle can be chosen differently between different sectors.

Figure 3:
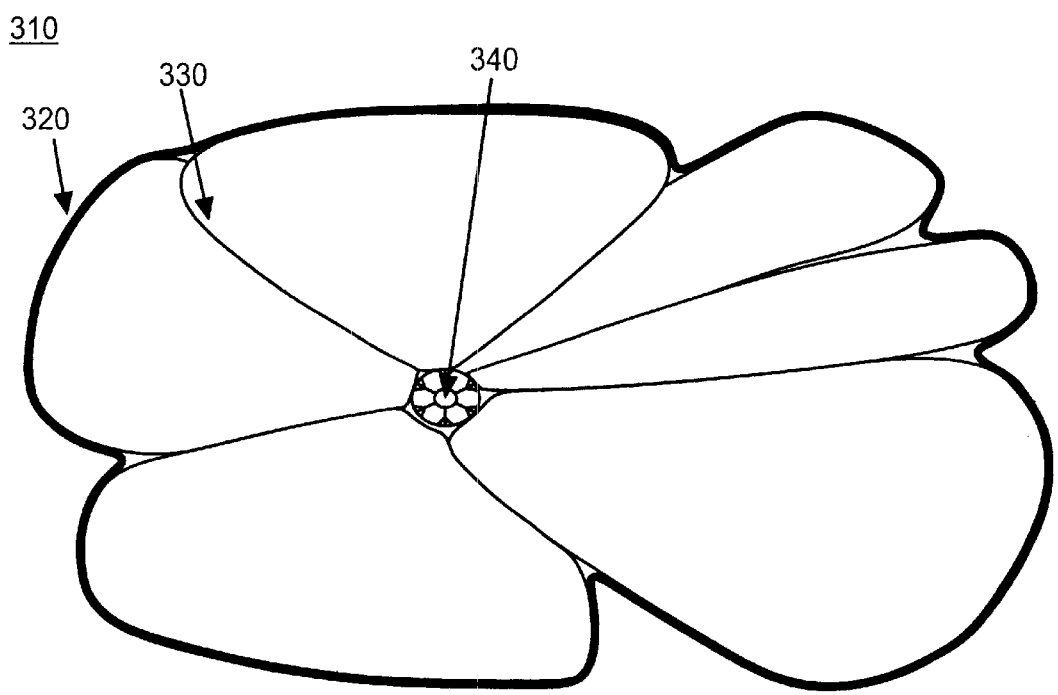
FIG. 3 is a diagram illustrating an irregular cellular coverage area.

As shown in FIG. 3, it is also possible to cover an irregular area 310 by choosing different radiation patterns of the antennas. FIG. 3 shows 6 irregularly-shaped sectors 330, although there can be more or less, can be distributed from an omni-directional site. The beacon carrier 320 is connected to an omni-directional antenna 340, providing the same coverage area as all the beams together. Irregular shaping can also be achieved by attenuation of the signals. The irregular area 310 covered can be contiguous, as shown here, or non-contiguous(i.e. broken), not shown. In some directions an antenna array comprising means for beamforming can be used to produce the sectors in a more feasible manner with respect to e.g. installation.

It is also considered that the beams may be interleaved with an alternating polarisation of e.g. ±45°. Because these alternating beams are uncorrelated, an advantage of this is the increase of 10 the uplink diversity gain, as the signal from the same mobile is received in uncorrelated polarisations.

Another advantage of having neighbour sectors with uncorrelated radiation properties is the possibility of combining the individual sector antenna diagrams into one whole for transmission of the beacon frequency. This is explained in more detail below.

The transmission of the beacon frequency for the circular diagram shown in FIG. 2 is easily obtained. This is done by simply adding an extra omni-directional antenna transmitting with the same coverage as provided by the sectors.

However, if all the sectors in irregular diagram, as shown in FIG. 3, are to be covered from one beacon antenna port then it is a bit more complicated. One idea, as part of this invention, is to combine the individual sector antennas together to one antenna port covering the whole irregular area. One important issue is that the signals from neighbouring antennas can combine together in uncontrolled manners, involving undesired peaks in the radiation patterns. It is here that the property of alternating uncorrelated polarisations is exploited in order to avoid the combinations of the different signals. Assuming that the signals from the neighbouring sectors are uncorrelated, it becomes possible to make a simple combining of the different sectors to one beacon pattern.

Figure 4:
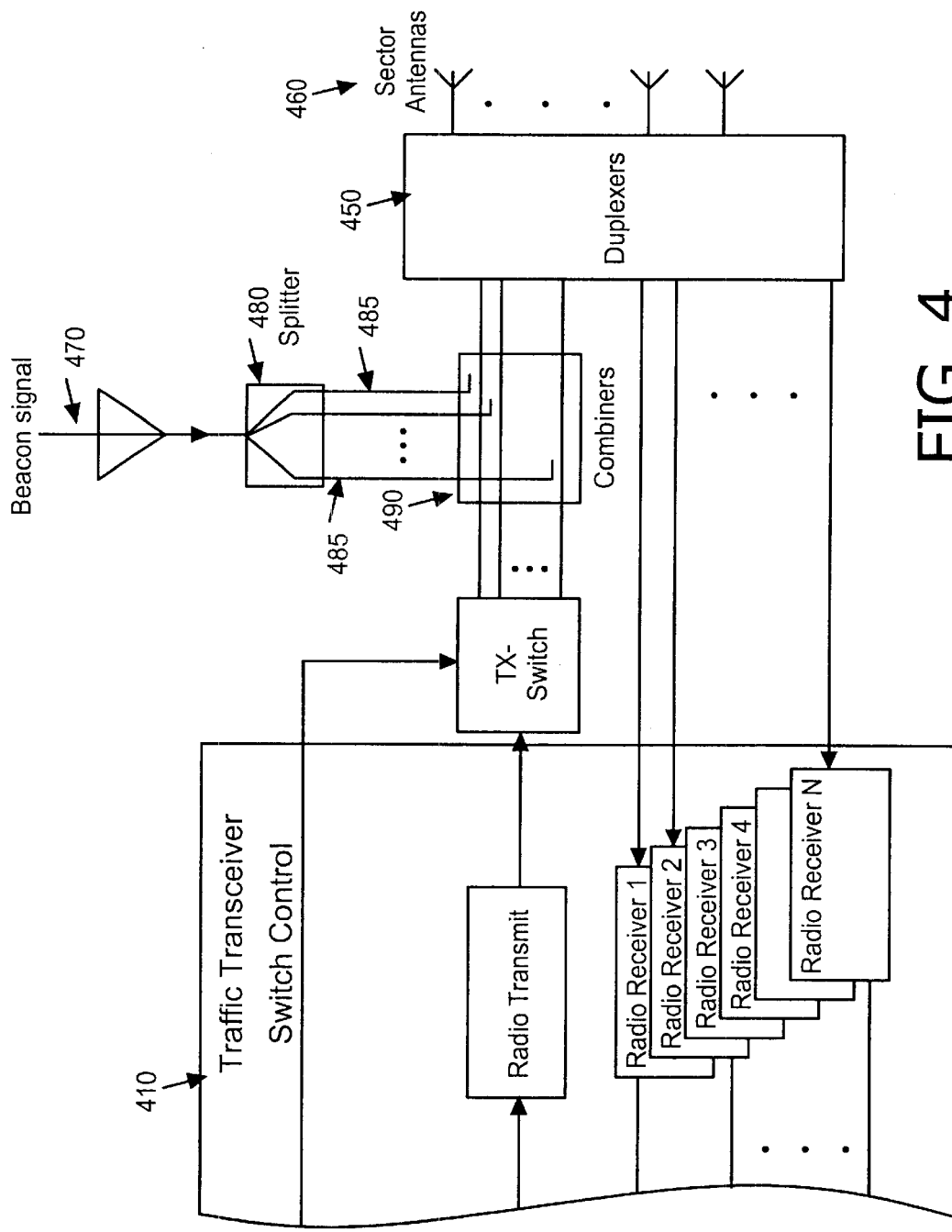
FIG. 4 is a diagram of a transceiver structure where a beacon signal is combined into the sector antenna.

FIG. 4 is another embodiment of the systems shown in FIG. 1. In addition to the features indicated in FIG. 1, FIG. 4 shows an example where the beacon signal 470 is combined in with each signal for transmission to each of the sector antennas 460. In the particular embodiment shown here the beacon signal 470 is first split 480 before being combined 490. The split beacon signal 485 can then be weighted differently onto the different sectors. The beacon carrier 470 can also be introduced between the duplexers 450 and the antenna elements 460, for instance for easier installation. However, this will introduce a combiner loss in the receiver direction.

This method for introducing the beacon signal into the antenna ports is a simple method, which doesn't require the mounting of an extra antenna for omni-directional beacon coverage. Furthermore, the beacon coverage can be introduced, thereby avoiding the necessity of calibrating the individual antenna terminals.

If the antenna terminals are coherent or calibrated, it is further possible to adjust phases and amplitudes before the combining in order to make a beam shaping of the resulting radiation pattern for the beacon signal. In this way correlated antennas, e.g. with the same polarisation, can be used in neighbouring sectors.

Figure 5:
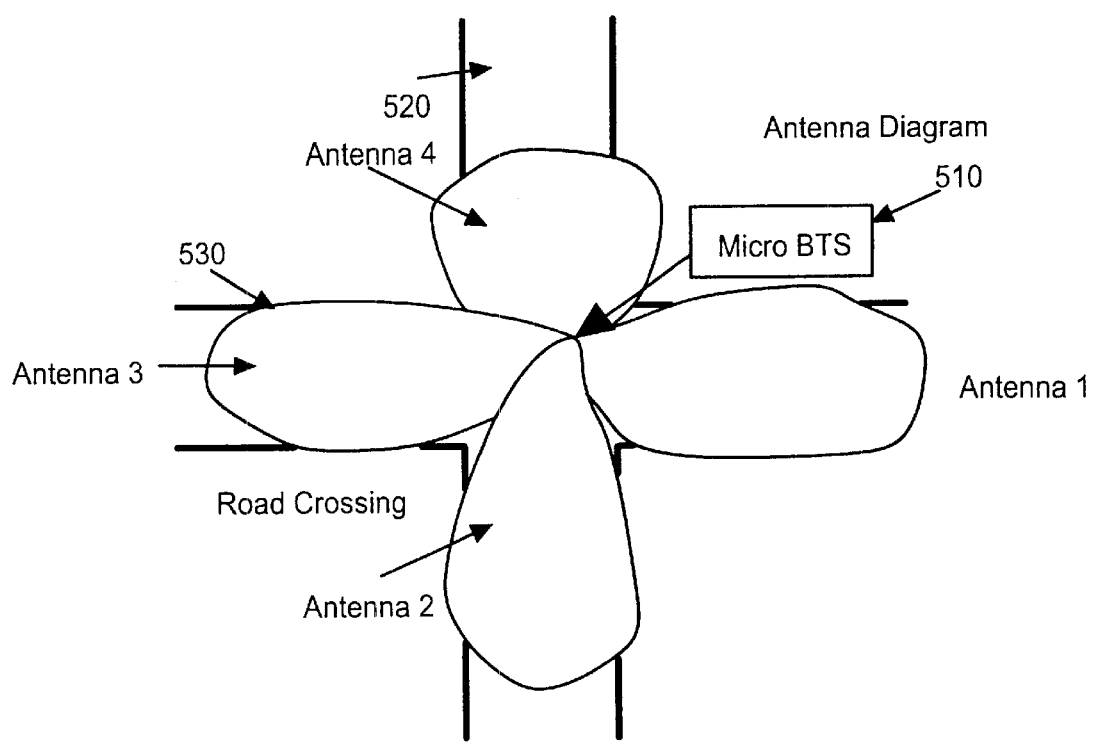
FIG. 5 illustrates the use of the present invention in a microcell application.

Another application of the transceiver structure 110, 410, as shown in FIGS. 1 and 4 is a micro-cell application as shown in FIG. 5. The new transceiver structure according to the present invention includes only one transmitter unit per transceiver and therefore does not require significantly more space or power, which typically is a limiting factor for a microcell base station. In addition, any extra antenna gain can be exploited to increase the obtainable EIRP by switching between antennas covering more well-defined areas.

The propagation from a micro base station 510 is difficult to control and can propagate a long way, e.g. along roads 520. By using the adaptive sectorization in a microcell application as shown in FIG. 5, the transmitted interference is limited to only one direction at a time.

The beacon coverage of the microcell application can be obtained in the same way as described above by combining the individual sector antennas. The transmitted and received interference is significantly reduced on the traffic frequencies by such an installation. The uplink is a diversity combining algorithm working on all 4 antenna branches, whereas the downlink is switched to only the antenna where the mobile telephone is located. This location is calculated by a location algorithm placed e.g. in the transceiver.

FIG. 5 shows a transceiver 510 connected to 4 antennas 530, each covering its own direction. The number 4 may be typical, but is used here for illustrative purposes only. If the adaptive sectorization transceiver includes 8 receivers then it is possible to introduce downlink diversity in the following way.

First assume that each of the 4 antennas 530 are double polarised, both polarisations covering the same area. This provides 8 antenna ports to be connected to the 8 receivers. The transmitter switch is likewise capable of choosing one out of the 8 antenna ports for transmission.

If a mobile station is located in the top road covered by antenna 4 as shown in FIG. 5, then the locating algorithm can choose among two polarisations for the same area. The locating algorithm can be designed to switch in a faster manner, e.g. on a burst level, in order to fast switch between the two possible polarisations in the downlink. In addition the uplink diversity is improved, as the same signal is received in two polarisations.

The embodiments described above serve merely as illustration and not as limitation. It will be apparent to one of ordinary skill in the art that departures may be made from the embodiments described above without departing from the spirit and scope of the invention. The invention should not be regarded as being limited to the examples described, but should be regarded instead as being equal in scope to the following claims.

What is claimed is:

1. A transceiver in a cellular radio communications system having at least one base station for a cell in said system, said cell having a plurality of sectors, said base station having a plurality of antennas, each of said sectors having an associated antenna in said plurality of antennas, said base station having at least one antenna for transmitting one broadcast beacon to all the sectors, the transceiver comprising:

one transmitter for transmitting from all of said antennas,
a receiver for each of said antennas, and
at least one duplexer connected to each of said plurality of antennas and a switch for switchably connecting said transmitter to the antennas in the different sectors,
wherein said broadcast beacon is first split and then combined.

2. The transceiver as claimed in claim 1, wherein the broadcast beacon is combined in combiners located between said switch and said at least one duplexer and transmitted on a plurality of antennas.

3. The transceiver as claimed in claim 1, wherein said broadcast beacon is combined in combiners located between said at least one duplexer and said antennas.

4. The transceiver as claimed in claim 1, further characterised wherein the antenna signals are shaped to change the coverage area, thereby reducing interference in this direction.

5. The transceiver as claimed in claim 4, further characterised wherein the coverage area is non-contiguous, thereby comprising a plurality of individual coverage areas.

6. The transceiver as claimed in claim 4, further characterised wherein shaping is achieved by adjusting the down-tilt angle of the antennas.

7. The transceiver as claimed in claim 4, further characterised wherein the shaping is achieved by attenuation of the signals.

8. The transceiver as claimed in claim 4, further characterised wherein the antennas are correlated and coherent, thereby allowing the shaping to be achieved by beamforming means.

9. The transceiver as claimed in claim 4, further characterised wherein the shape achieved is general circular and the beacon is transmitted from an extra omni-directional antenna which provides the same coverage as the sector antennas.

10. The transceiver as claimed in claim 1, further characterised wherein adjacent antennas are uncorrelated.

11. The transceiver as claimed in claim 10, further characterised wherein the antennas are uncorrelated by having polarisations of −45° and +45°, respectively, and are placed in an alternating pattern.

12. The transceiver as claimed in claim 4, further characterised wherein the antennas correlated and are coherent or calibrated thereby allowing the shaping by adjusting the phases or amplitudes of the signals from each antenna.

13. The transceiver as claimed in claim 1, further characterised wherein the transceiver transmits to a mobile station on a downlink channel and receives on an uplink channel, the uplink channel comprising a signal combined from a plurality of antennas and the downlink is transmitted on the antenna associated with the sector in which the mobile station is located.

14. The transceiver as claimed in claim 13, further characterised wherein the mobile station is located by a location algorithm thereby allowing the transmitted downlink signal to be switched to the antenna associated with the sector in which the mobile station is located.

15. The transceiver as claimed in claim 14, further characterised wherein the location algorithm is placed in the transceiver.

16. The transceiver as claimed in claim 13, further characterised wherein each antenna is dual polarised, each polarisation covering the same area, thereby providing twice as many antenna ports, one for each polarisation, as antennas, and each antenna port is associated with a receiver with the downlink signal being switched to one of the two ports transmitting to the sector in which the mobile station is located.

* * * * *